United States Patent
Fan et al.

(10) Patent No.: US 10,914,952 B2
(45) Date of Patent: Feb. 9, 2021

(54) HEAD MOUNTED DISPLAY DEVICE WITH WIDE FIELD OF VIEW

(71) Applicant: HTC Corporation, Taoyuan (TW)

(72) Inventors: Fu-Cheng Fan, Taoyuan (TW); Chung-Jung Chen, Taoyuan (TW); Chun-Ta Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/976,880

(22) Filed: May 11, 2018

(65) Prior Publication Data

US 2018/0335631 A1 Nov. 22, 2018

Related U.S. Application Data

(60) Provisional application No. 62/506,620, filed on May 16, 2017.

(51) Int. Cl.
G02B 27/01 (2006.01)
G02F 1/1335 (2006.01)
(Continued)

(52) U.S. Cl.
CPC ....... *G02B 27/0172* (2013.01); *G02B 3/0037* (2013.01); *G02B 27/0075* (2013.01);
(Continued)

(58) Field of Classification Search
CPC ............. G02B 27/0172; G02B 3/0037; G02B 27/0075; G02B 2017/014;
(Continued)

(56) References Cited

U.S. PATENT DOCUMENTS

2002/0118273 A1* 8/2002 Chandra ............ G02B 27/0101
348/42
2007/0097277 A1* 5/2007 Hong ................. G02B 27/0172
349/11
(Continued)

FOREIGN PATENT DOCUMENTS

CN 106019605 10/2016
CN 104246578 12/2016
(Continued)

OTHER PUBLICATIONS

"Office Action of Taiwan Counterpart Application", dated Oct. 19, 2018, p. 1-p. 5.
(Continued)

*Primary Examiner* — Kwang-Su Yang
(74) *Attorney, Agent, or Firm* — JCIPRNET

(57) ABSTRACT

A head mounted display (HMD) includes a first transparent light source, a first micro-lens array panel and a first transparent LCD panel. The first transparent light source emits a plurality of pin-lights along a first light projection path. The first micro-lens array panel having a plurality of micro-lens, and the micro-lens respectively receive the pin-lights and adjust characteristics of projection surfaces of the pin-lights to generate a plurality of adjusted lights. The first transparent LCD panel receives the adjusted lights and generates a first display image according to the adjusted lights.

9 Claims, 4 Drawing Sheets

(51) Int. Cl.
*G02B 3/00* (2006.01)
*G09G 3/00* (2006.01)
*G02B 27/00* (2006.01)

(52) U.S. Cl.
CPC ......... *G09G 3/00* (2013.01); *G02B 2027/014* (2013.01); *G02B 2027/0127* (2013.01); *G02B 2027/0132* (2013.01); *G02F 1/133526* (2013.01)

(58) Field of Classification Search
CPC .... G02B 2027/0127; G02B 2027/0132; G09G 3/00; G02F 1/133526
See application file for complete search history.

(56) References Cited

U.S. PATENT DOCUMENTS

| | | | |
|---|---|---|---|
| 2013/0021226 | A1 | 1/2013 | Bell |
| 2013/0285885 | A1* | 10/2013 | Nowatzyk ............ G02B 3/0006 345/8 |
| 2015/0049390 | A1* | 2/2015 | Lanman ............... G02B 3/0037 359/622 |
| 2015/0277126 | A1* | 10/2015 | Hirano .................. G02B 7/008 359/633 |
| 2016/0029017 | A1* | 1/2016 | Liang ....................... G06T 7/80 348/175 |
| 2016/0097931 | A1* | 4/2016 | Takahota ............... G02B 27/01 345/690 |

FOREIGN PATENT DOCUMENTS

| | | | |
|---|---|---|---|
| JP | 2015219425 | 12/2015 | |
| JP | 2015219425 A | * 12/2015 | ......... G02B 27/0172 |

OTHER PUBLICATIONS

"Office Action of China Counterpart Application", dated Apr. 24, 2020, p. 1-p. 12.

* cited by examiner

HEAD MOUNTED DISPLAY DEVICE WITH WIDE FIELD OF VIEW

CROSS-REFERENCE TO RELATED APPLICATION

This application claims the priority benefit of U.S. provisional application Ser. No. 62/506,620, filed on May 16, 2017. The entirety of the above-mentioned patent application is hereby incorporated by reference herein and made a part of this specification.

BACKGROUND OF THE INVENTION

Field of the Invention

The invention relates to a head mounted display device, and more particularly, to a head mounted display device with wide field of view.

Description of Related Art

With the advancement of electronic technology, head-mounted display devices that can provide display effects of virtual reality and augmented reality have become a new and popular display device.

In a head mounted display device with wide field of view in the existing technical field, a plurality of pin-lights are disposed to form an illumination array so a display image can be generated by a liquid crystal panel through a light field image algorithm. However, because projection surfaces of the pin-lights would overlap with each other on the liquid crystal panel and luminances of overlapping regions would be relatively high, the display image generated by the liquid crystal panel may show of a honeycomb-like effect, thereby deteriorating the display quality. To avoid such a phenomenon, the display image is compensated by performing complex calculations in the conventional technology, which not only increases the difficulty in design but also increases the production cost.

SUMMARY OF THE INVENTION

The invention provides a head mounted display device capable of improving the display quality.

The head mounted display device of the invention includes a first transmissive light source, a first micro-lens array substrate and a first transparent LCD panel. The first transmissive light source emits a plurality of first pin-lights along a first light projection path. The first micro-lens array substrate has a plurality of first micro-lenses for respectively receiving the first pin-lights and separately adjusting characteristics of a plurality of projection surfaces of the first pin-lights to generate a plurality of adjusted lights. The first transparent LCD panel is disposed on the first light projection path. The first transparent LCD panel receives the adjusted lights and generates a first display image according to the adjusted lights.

Based on the above, the invention provides the head mounted display device disposed with the micro-lens array substrate to adjust the characteristics of the projection surfaces of the pin-lights by the micro-lenses on the micro-lens array substrate so areas of the overlapping regions of the projection surfaces of the adjusted lights projected on the transparent LCD panel may be effectively reduced. In this way, the issue regarding poor brightness uniformity may be easily solved, and the display quality may also be improved without increasing the cost and the design complexity of the head mounted display device.

To make the above characteristics and advantages of the disclosure more comprehensible, several embodiments accompanied with drawings are described in detail as follows.

DESCRIPTION OF THE EMBODIMENTS

Figure 1:
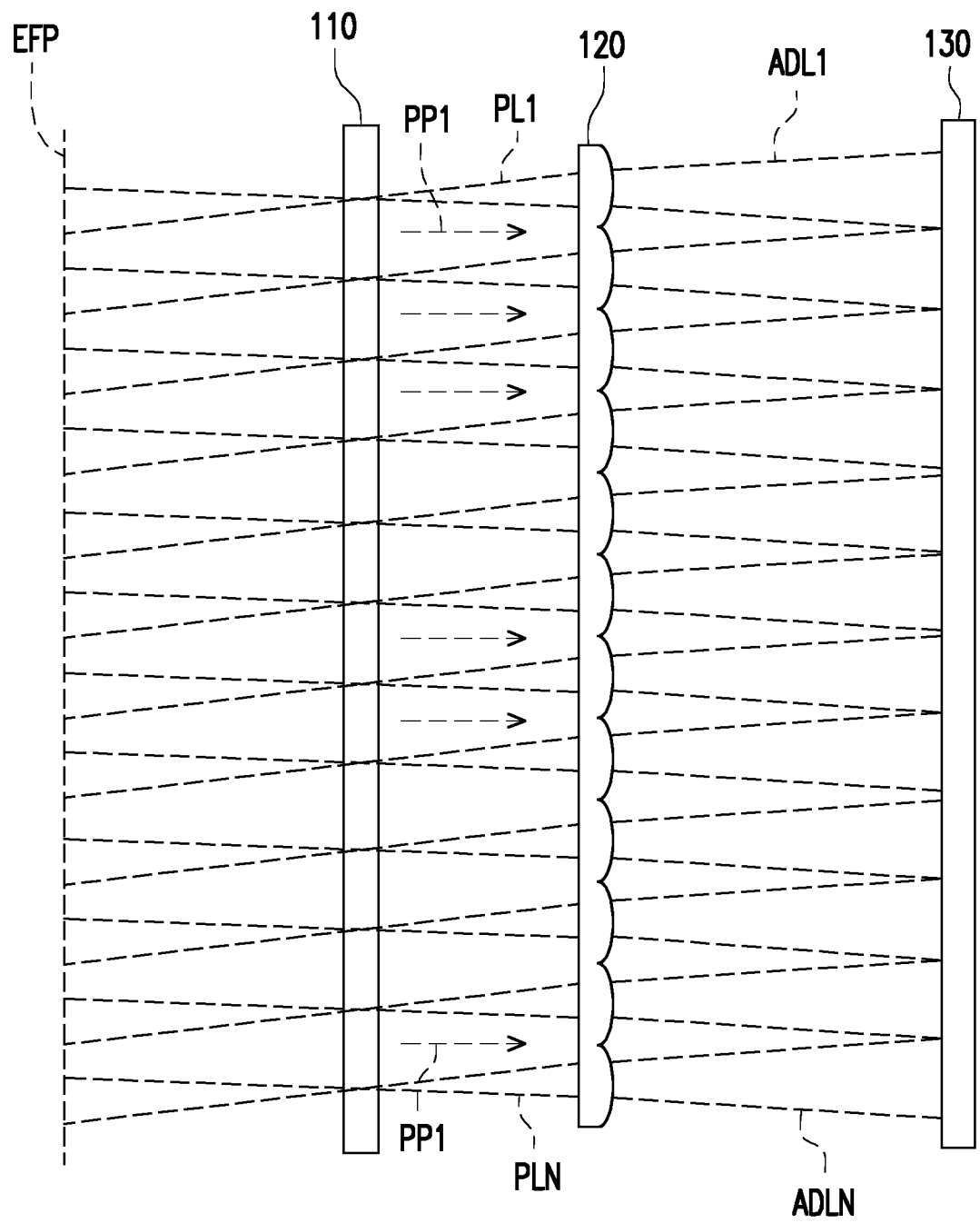
FIG. 1 is a schematic diagram illustrating a head mounted display device in an embodiment of the invention.

With reference to FIG. 1, FIG. 1 is a schematic diagram illustrating a head mounted display device in an embodiment of the invention. A head mounted display device 100 includes a transmissive light source 110, a micro-lens array substrate 120 and a transparent liquid crystal display (LCD) panel 130. The transmissive light source 110 is disposed with a plurality of light emitting elements, and separately emits a plurality of pin-lights PL1 to PLN to the micro-lens array substrate 120 along a light projection path PP1. The micro-lens array substrate 120 is disposed with a plurality of micro-lenses, which are used to respectively receive the pin-lights PL1 to PLN and respectively adjust characteristics of a plurality of projection surfaces of the pin-lights PL1 to PLN to generate a plurality of adjusted lights ADL1 to ADLN. The adjusted lights ADL1 to ADLN are projected to the transparent LCD panel 130.

The transparent LCD panel 130 receives the adjusted lights ADL1 to ADLN and generates a display image according to the adjusted lights ADL1 to ADLN. The display image generated by the transparent LCD panel 130 may pass through the micro-lens array substrate 120 and may be projected to the transmissive light source 110, so as to form a virtual image on an eye focus plane EFP in front of the eyeball of the user. In this way, the user can then observe the display image generated by the transparent LCD panel 130.

It should be noted that, in this embodiment, the transparent LCD panel 130, the micro-lens array substrate 120 and the transmissive light source 110 may be arranged in sequence before the eyes of the user, and arranged in an overlapping manner along a light projection path PP1 of the transmissive light source 110. In other words, the eyeball of the user may be positioned on the right side of the transparent LCD panel 130 illustrated in FIG. 1. It should also be noted that, the transmissive light source 110 is used to separately and synchronously generate the pin-lights PL1 to PLN at different positions, where a region of a projection surface of each of the pin-lights PL1 to PLN becomes larger as a projection distance increases. Therefore, an overlapping phenomenon may exist between the projection surfaces formed by the adjacent pin-lights.

Based on the above, in the embodiments of the invention, the micro-lens array substrate 120 is provided to receive the pin-lights PL1 to PLN and adjust the characteristics of the projection surfaces of the pin-lights PL1 to PLN through a plurality of lens formed on the micro-lens array substrate 120, so as to generate the adjusted lights ADL1 to ADLN. In this embodiment, by adjusting the characteristics of the projection surfaces of the pin-lights PL1 to PLN (e.g., adjusting at least one of areas and shapes of the projection surfaces of the pin-lights PL1 to PLN), the micro-lens array substrate 120 may reduce overlapping regions between the projection surfaces of the adjacent adjusted lights among the adjusted lights ADL1 to ADLN.

Figure 2:
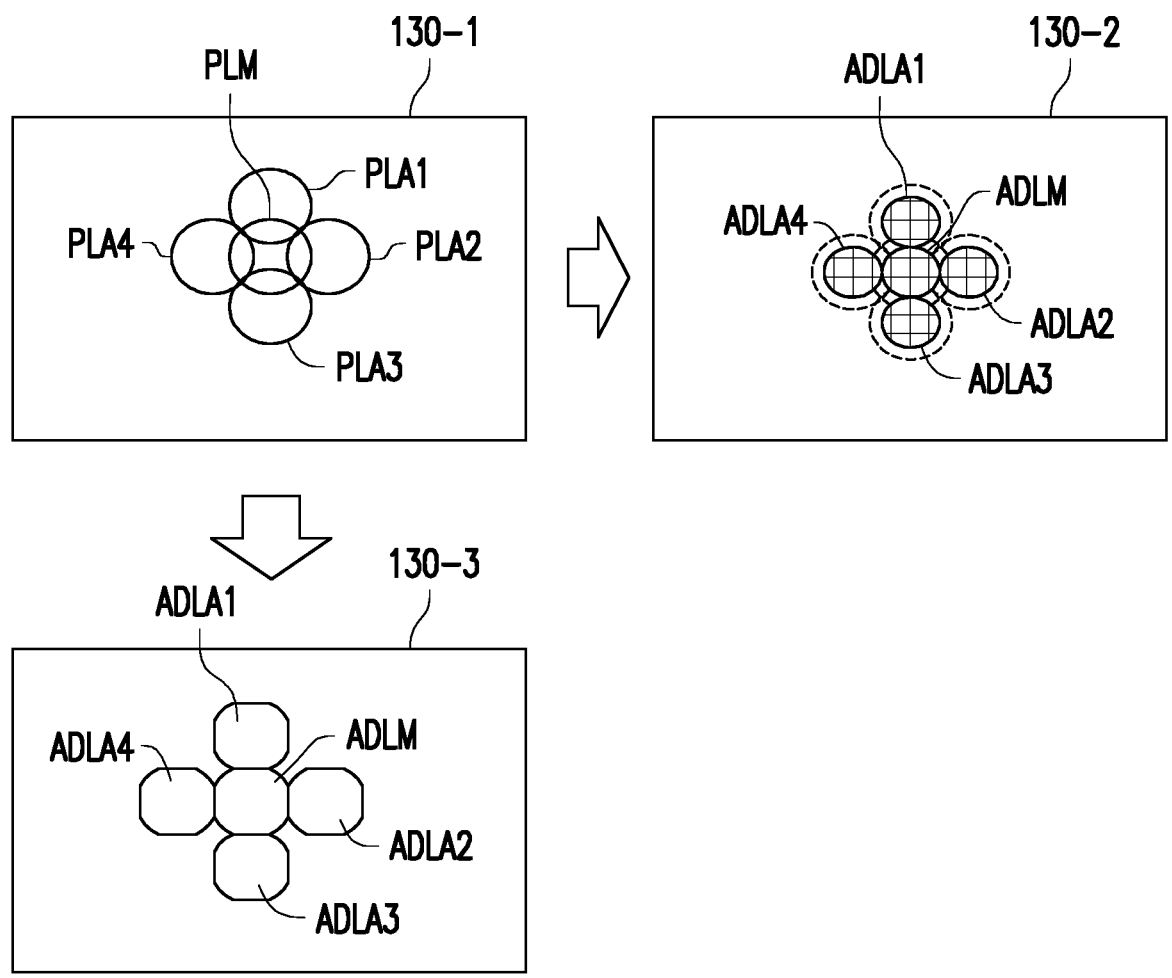
FIG. 2 is a schematic diagram illustrating an adjusting method for a pin light beam in an embodiment of the invention.

With reference to both FIG. 1 and FIG. 2, FIG. 2 is a schematic diagram illustrating an adjusting method of the pin light beam in an embodiment of the invention. A transparent LCD panel 130-1 displays a schematic diagram of the projection surfaces not adjusted by the micro-lens array substrate 120 but formed by directly receiving the pin-lights PL1 to PLN. In this diagram, projection surfaces PLM and PLA1 to PLA4 are generated on the transparent LCD panel 130-1 by the adjacent pin-lights. Further, overlapping regions with specific area size are created between an edge region of the projection surface PLM and edge regions of the projection surfaces PLA1 to PLA4.

A transparent LCD panel 130-2 displays a schematic diagram of projection surfaces ADLM and ADLA1 to ADLA4 formed on the transparent LCD panel 130-2 by the adjacent pin-lights with areas of the projection surfaces being reduced by the micro-lens array substrate 120. Through the adjustment operation of the micro-lens array substrate 120, the areas of the overlapping regions between the projection surface ADLM and the projection surfaces ADLA1 to ADLA4 generated by the adjusted lights on the micro-lens array substrate 120 may be effectively reduced.

A transparent LCD panel 130-3 displays a schematic diagram of projection surfaces ADLM and ADLA1 to ADLA4 foil red on the transparent LCD panel 130-2 with shapes of the projection surfaces of the adjacent pin-lights being adjusted by the micro-lens array substrate 120. By adjusting the shapes of the projection surfaces of the pin-lights to a non-circular shape (e.g., to rectangle-like shapes), the micro-lens array substrate 120 may also effectively reduce the areas of the overlapping regions between the projection surface ADLM and the projection surfaces ADLA1 to ADLA4.

Figure 3A:
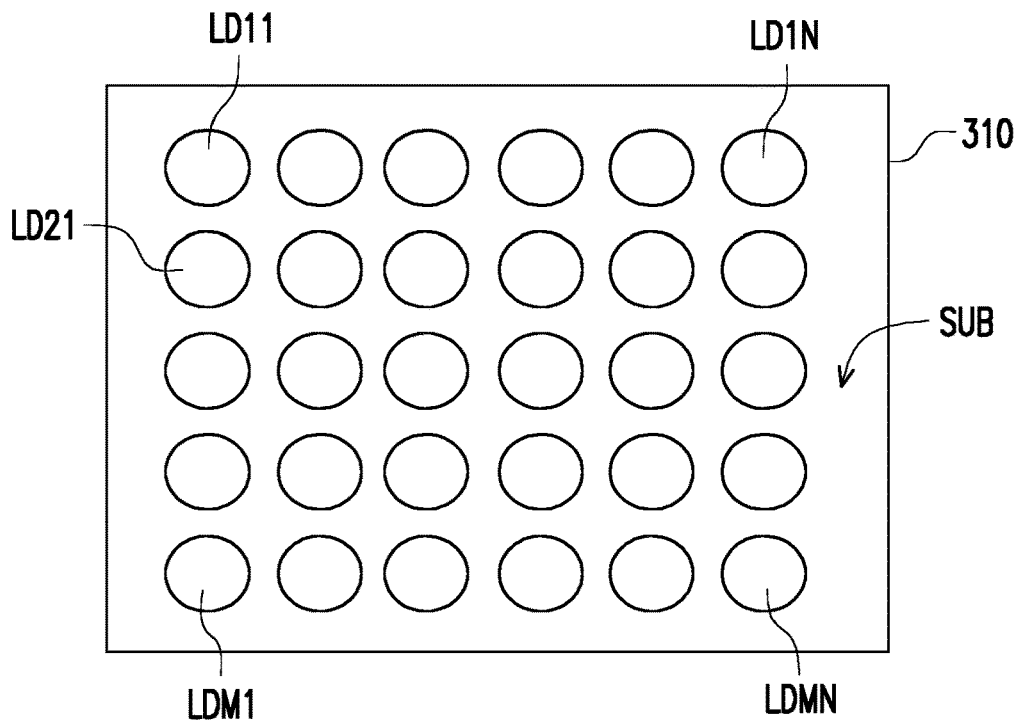
FIG. 3A and FIG. 3B are schematic diagrams respectively illustrating different implementations of a transmissive light source according to the embodiments of the invention.
Figure 3B:
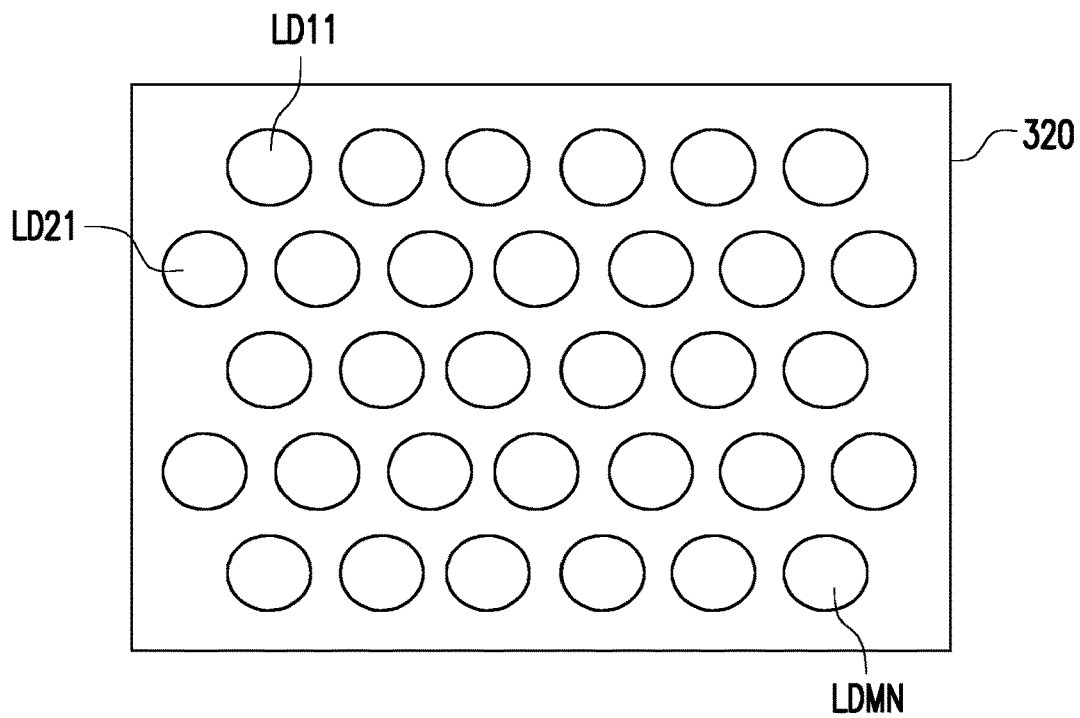

With reference to both FIG. 3A and FIG. 3B, FIG. 3A and FIG. 3B are schematic diagrams respectively illustrating different implementations of a transmissive light source according to the embodiments of the invention. A transmissive light source 310 has a plurality of light emitting elements LD11 to LDMN. The light emitting elements LD11 to LDMN are used to emit a plurality of pin-lights. The light emitting elements LD11 to LDMN may be formed by using micro light emitting diodes or any other light emitting elements well-known to persons with ordinary skill in the art without particular limitations.

In FIG. 3A, the light emitting elements LD11 to LDMN are disposed on a transparent substrate SUB and arranged in a uniform array. In FIG. 3A, a plurality of aligned rows and a plurality of aligned columns are formed by the light emitting elements LD11 to LDMN. In this case, each column has the same number of the light emitting elements, and each row also has the same number of the light emitting elements.

In FIG. 3B, a transmissive light source 320 is disposed with a plurality of light emitting elements LD11 to LDMN which are not uniformly arranged. Here, in the transmissive light source 320, the light emitting elements in adjacent rows (columns) are arranged in a staggered manner, and each column (row) does not need to have the same number of the light emitting elements.

According to the description for FIGS. 3A and 3B, it can be known that, on the transmissive light source in the embodiments of the invention, there are no particular limitations on the arrangement and the number of the light emitting elements being disposed. The designer can configure the transmissive light source according to requirements on the display effect of the head mounted display device.

Figure 4:
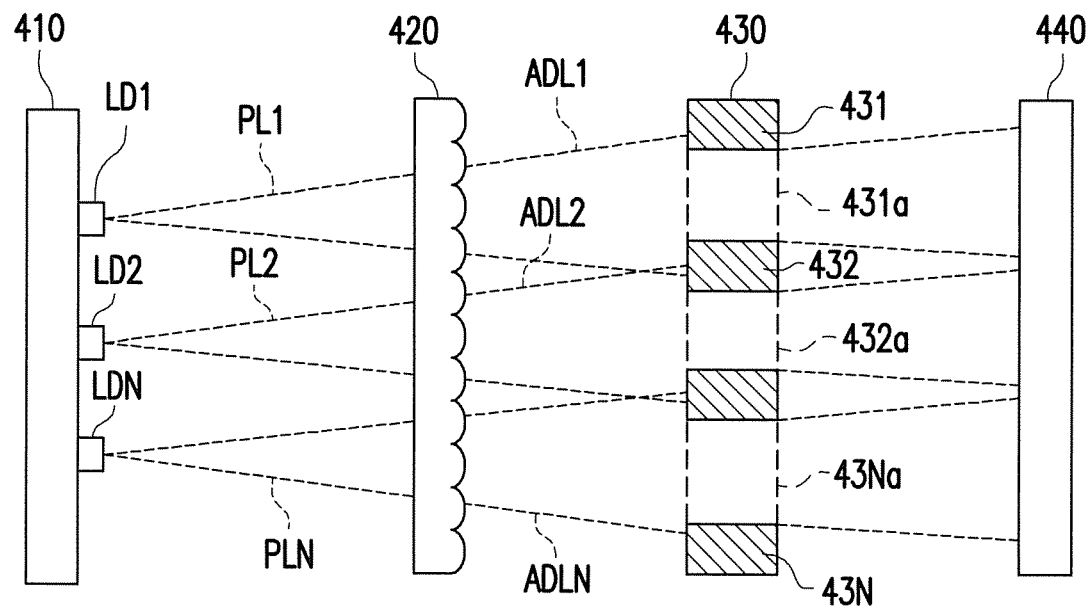
FIG. 4 is a schematic diagram illustrating a head mounted display device in another embodiment of the invention.

With reference to FIG. 4, FIG. 4 is a schematic diagram lustrating a head mounted display device in another embodiment of the invention. A head mounted display device 400 includes a transmissive light source 410, a micro-lens array substrate 420, a shading plate 430 and a transparent LCD panel 440. The transmissive light source 410 is disposed with a plurality of light emitting elements LD1 to LDN, and separately emits a plurality of pin-lights PL1 to PLN along a light projection path. The micro-lens array substrate 420 is disposed on the light projection path to respectively receive the pin-lights PL1 to PLN and generate a plurality of adjusted lights ADL1 to ADLN by adjusting the characteristics of a plurality of projection surfaces of the pin-lights PL1 to PLN. The shading plate 430 is disposed between the micro-lens array substrate 420 and the transparent LCD panel 440 and disposed on a projection path of the adjusted lights ADL1 to ADLN. The shading plate 430 has a plurality of shading structures 431 to 43N and a plurality of transparent structures 431a to 43Na. Here, the shading structures 431 to 43N are disposed at a plurality of overlapping regions between a plurality of projection surfaces of the adjusted lights ADL1 to ADLN, and the transparent structures 431a to 43Na are respectively disposed between the shading structures 431 to 43N.

It can be observed that, the light beams at the overlapping regions between the projection surfaces of the adjusted lights ADL1 to ADLN would be blocked by the shading structures 431 to 43N rather than being projected to the transparent LCD panel 440. In this way, the display image formed on the transparent LCD panel 440 would not be affected by the light beam with overly high brightness in the overlapping regions between the projection surfaces of the light beams so the quality of the display image can be improved accordingly.

Figure 5:
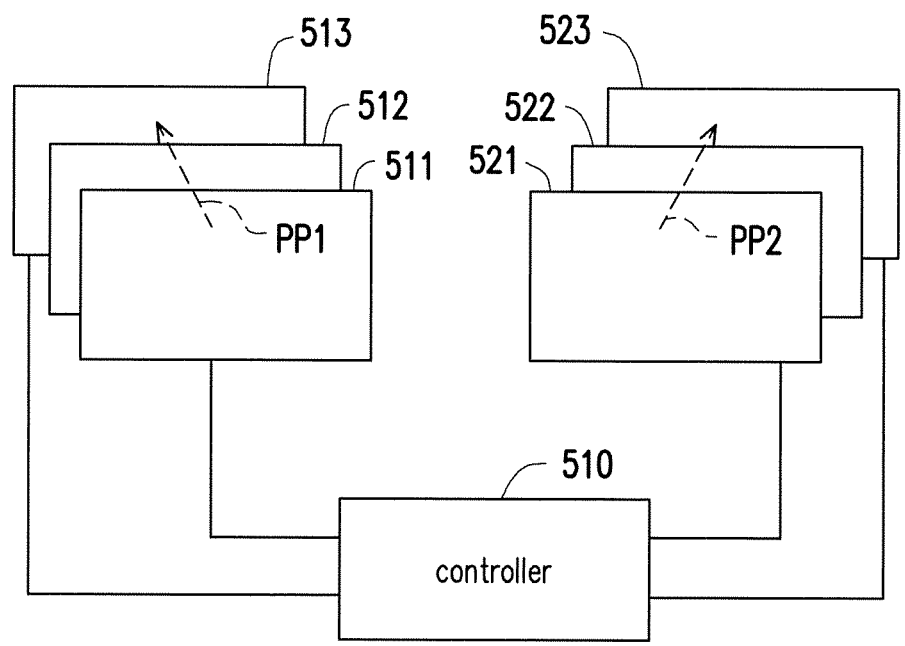
FIG. 5 is a schematic diagram illustrating a head mounted display device in yet another embodiment of the invention.

With reference to FIG. 5, FIG. 5 is a schematic diagram illustrating a head mounted display device in yet another embodiment of the invention. A head mounted display device 500 includes transmissive light sources 511 and 521, micro-lens array substrates 512 and 522, transparent LCD panels 513 and 523 and a controller 510. The transmissive light source 511, the micro-lens array substrate 512 and the transparent LCD panel 513 are arranged in sequence along a light projection path PP1 and overlap with each other. The transmissive light source 511 emits a plurality of pin light beam along the light projection path PP1 such that the transparent LCD panel 513 correspondingly generates a display image. Here, the transparent LCD panel 513 may generate the display image for a first eye. The transmissive light source 521, the micro-lens array substrate 522 and the transparent LCD panel 523 are arranged in sequence along a light projection path PP2 and overlap with each other. The transmissive light source 521 emits a plurality of pin light beam along the light projection path PP2 such that the transparent LCD panel 523 correspondingly generates another display image. Here, the transparent LCD panel 523 may generate the display image for a second eye.

The controller 510 is coupled to the transmissive light sources 511 and 521, and may be coupled to the transparent LCD panels 513 and 523. The controller 510 may be used to adjust luminances of the pin-lights generated by the transmissive light sources 511 and 521. It should be noted that, aside from the adjustment of the controller 510 on the luminances of the pin-lights generated by the transmissive light sources 511 and 521, the controller 510 may also conduct a regional adjustment on each of the luminances of the pin-lights belonging to different regions for each of the transmissive light sources 511 and 521.

On the other hand, the controller 510 may simultaneously control the transparent LCD panels 513 and 523 to respectively generate the display images for the first eye and the second eye according to the adjusted lights being received through a light field image algorithm. It should be noted that, in the embodiments of the invention, the controller 510 may apply the light field image algorithm well-known to persons with ordinary skill in the art without particular limitations.

The controller 510 may be a processor with computing capability. Alternatively, the controller 730 may be a hardware circuit designed through Hardware Description Language (HDL) or any other design methods for digital circuit well-known to persons with ordinary skill in the art and may be implemented in from of Field Programmable Gate Array (FPGA), Complex Programmable Logic Device (CPLD) or Application-specific Integrated Circuit (ASIC). In addition, the storage device may be any random access memory (RAM), read only memory (ROM) or the like, but the invention is not limited in this regard.

In summary, according to the head mounted display of the invention with the micro-lens array substrate disposed therein, by changing the characteristics of the projection surfaces of the pin-lights, the areas of the overlapping regions of the light beams (the adjusted light beam) projected on the transparent LCD panel may be effectively reduced. As a result, the image quality of the display image generated by the transparent LCD panel may be effectively improved.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A head mounted display device, comprising:
   a first transmissive light source emitting a plurality of first pin-lights along a first light projection path;
   a first micro-lens array substrate having a plurality of first micro-lenses for respectively receiving the first pin-lights and separately adjusting characteristics of a plurality of projection surfaces by adjusting shapes of the projection surfaces of the first pin-lights to generate a plurality of adjusted lights; and
   a first transparent liquid crystal display (LCD) panel disposed on the first light projection path for receiving the adjusted lights and generating a first display image according to the adjusted lights.

2. The head mounted display device according to claim 1, further comprising:
   a first shading plate, disposed between the first micro-lens array substrate and the first transparent LCD panel and disposed on a projection path of the adjusted lights, the first shading plate having a plurality of shading structures disposed at a plurality of overlapping regions between a plurality of projection surfaces of the adjusted lights.

3. The head mounted display device according to claim 2, wherein the first shading plate further comprises a plurality of transparent structures, respectively disposed between the shading structures.

4. The head mounted display device according to claim 1, further comprising:
   a controller having the first transmissive light source, the controller being configured to adjust a plurality of luminances of the first pin-lights respectively belonging to a plurality of distribution regions in the first transmissive light source.

5. The head mounted display device according to claim 4, wherein the controller is further coupled to the first transparent LCD panel to make the first transparent LCD panel generate the first display image according to the adjusted lights through a light field image algorithm.

6. The head mounted display device according to claim 1, further comprising:
   a second transmissive light source emitting a plurality of second pin-lights along a second light projection path;
   a second micro-lens array substrate having a plurality of second micro-lenses for respectively receiving the second pin-lights and separately adjusting characteristics of a plurality of projection surfaces of the second pin-lights to generate a plurality of second adjusted lights; and
   a second transparent liquid crystal display (LCD) panel disposed on the second light projection path for receiving the second adjusted lights and generating a second display image according to the second adjusted lights,
   wherein each of the second micro-lenses adjusts the characteristics of the projection surfaces corresponding to the respective second pin light beam to generate each of the corresponding second adjusted lights.

7. The head mounted display device according to claim 6, further comprising:
   a second shading plate disposed between the second micro-lens array substrate and the second transparent LCD panel and disposed on the second light projection path, wherein the second shading plate has a plurality of shading structures disposed at a plurality of overlapping regions between a plurality of projection surfaces of the second adjusted lights.

8. The head mounted display device according to claim 7, wherein the second shading plate further comprises a plurality of transparent structures, respectively disposed between the shading structures.

9. The head mounted display device according to claim 6, wherein the second micro-lenses respectively adjust shapes of projection surfaces of the second pin-lights.

* * * * *